US010392032B2

(12) United States Patent
Gastal et al.

(10) Patent No.: US 10,392,032 B2
(45) Date of Patent: Aug. 27, 2019

(54) SIDE GLAZING FOR MEANS OF TRANSPORT FIXED FROM THE OUTSIDE

(71) Applicant: SAINT-GOBAIN GLASS FRANCE, Courbevoie (FR)

(72) Inventors: Guillaume Gastal, Zary (PL); Andrzej Odulinsky, Zary (PL)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/758,913

(22) PCT Filed: Sep. 6, 2016

(86) PCT No.: PCT/FR2016/052202
§ 371 (c)(1),
(2) Date: Mar. 9, 2018

(87) PCT Pub. No.: WO2017/042465
PCT Pub. Date: Mar. 16, 2017

(65) Prior Publication Data
US 2018/0251139 A1    Sep. 6, 2018

(30) Foreign Application Priority Data
Sep. 9, 2015 (FR) .................................. 15 58382

(51) Int. Cl.
*B32B 3/06* (2006.01)
*B61D 25/00* (2006.01)
*B60J 1/00* (2006.01)
*B60J 1/10* (2006.01)

(52) U.S. Cl.
CPC .............. *B61D 25/00* (2013.01); *B60J 1/006* (2013.01); *B60J 1/10* (2013.01); *Y10T 428/24008* (2015.01)

(58) Field of Classification Search
CPC .... Y10T 428/24008; Y10T 428/24322; B61D 25/00; B60J 1/006
See application file for complete search history.

(56) References Cited

U.S. PATENT DOCUMENTS 7,080,874 B2    7/2006  Farrar et al.

FOREIGN PATENT DOCUMENTS

| CN | 204368159 U | 6/2015 |
|---|---|---|
| DE | 233 977 A1 | 3/1986 |
| EP | 2 796 334 A1 | 10/2014 |
| JP | S61-36428 U | 3/1986 |
| WO | WO 2004/033238 A2 | 4/2004 |

OTHER PUBLICATIONS

International Search Report as issued in International Patent Application No. PCT/FR2016/052202, dated Dec. 15, 2016.

*Primary Examiner* — Alexander S Thomas
(74) *Attorney, Agent, or Firm* — Pillsbury Winthrop Shaw Pittman LLP

(57) ABSTRACT

A side glazing of a transport vehicle, particularly a glazing for a tramway, includes a mounting plate that has a hole passing all the way through and opening onto the exterior face and onto the interior face of the mounting plate and a glazed element that has at least one hole passing all the way through and opening onto the exterior face and onto the interior face of the glazed element, the hole in the glazed element being coaxial with the hole in the mounting plate.

12 Claims, 2 Drawing Sheets

SIDE GLAZING FOR MEANS OF TRANSPORT FIXED FROM THE OUTSIDE

CROSS-REFERENCE TO RELATED APPLICATIONS

Figure 1:
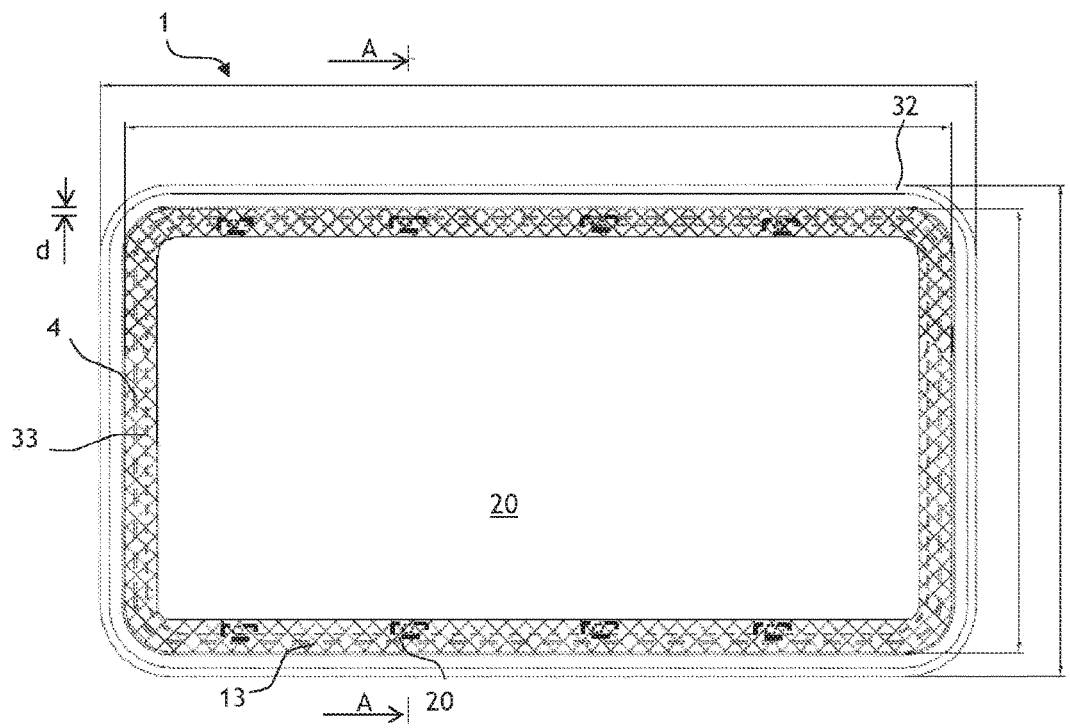

This application is the U.S. National Stage of PCT/FR2016/052202, filed Sep. 6, 2016, which in turn claims priority to French patent application number 1558382 filed Sep. 9, 2015. The content of these applications are incorporated herein by reference in their entireties.

The invention relates to the creation of a side glazing of a means of transport and, in particular, a glazing for a tramway or a train, said glazing being a fixed, possibly laminated, glazing.

Such a glazing habitually comprises:
- a glazed element having an exterior face that faces an exterior space, an interior face which faces an interior space, and a peripheral edge face,
- at least one mounting plate having an exterior face situated facing the interior face of said glazed element, an interior face oriented toward said interior space, and a peripheral edge face, and said exterior face of said mounting plate being bonded to said interior face of said glazed element by means of a layer of glue,
- a peripheral profiled strip, situated at least partly on said interior face and further toward the periphery of said interior face of said glazed element than said mounting plate,
- a threaded rod which extends substantially perpendicular to said interior face of said glazed element and in the direction of said interior space.

The prior art thus acknowledges U.S. Pat. No. 7,080,874 which sets out a solution for fixing a glazing into an opening.

In that document it is proposed for the threaded rod to be fixed to the mounting plate on the interior face of the mounting plate.

The prior art also acknowledges European patent application No. EP 2 796 334 which discloses another solution for fixing a glazing into an opening.

It is an object of the invention to allow a fixed, possibly laminated, glazing to be created that is easier to fix than in the prior art.

Specifically, the glazed element, the opening and the positioning of the mounting plate with respect to the glazed element each have an associated manufacturing tolerance and, in practice, the respective positioning of the ones relative to the others, especially when (and this is recommended) there are several mounting plates per glazing and especially when the glazing element is laminated (which it may need to be for certain applications, for safety reasons), may give rise to differences with respect to the desired nominal position according to the drawings.

This possible discrepancy between the nominal positions and the actual positions of the constituent parts of the glazing and of the means of transport is a significant problem especially when a glazing is being replaced following breakage because the objective is for such replacement to be as quick and easy as possible in order to limit the cost of the down-time of the means of transport.

The invention thus relies on the fact that the threaded rod is designed to be able to be turned by a suitable tool from the exterior space or prevented from turning from the exterior space.

Furthermore, the invention makes it possible to reduce the bulk of the glazing fixing and thus allows the glazing to be fixed further toward the outside, thereby increasing the volume available inside the means of transport.

The invention relates, in its broadest sense, to a side glazing of a means of transport, particularly a glazing for a tramway, according to claim 1. This glazing is a fixed glazing which comprises:
- a glazed element having an exterior face that faces an exterior space, an interior face which faces an interior space, and a peripheral edge face,
- at least one mounting plate having an exterior face situated facing the interior face of said glazed element, an interior face oriented toward said interior space, and a peripheral edge face, and said exterior face of said mounting plate being bonded to said interior face of said glazed element by means of a layer of glue,
- a peripheral profiled strip, situated at least partly on said interior face and further toward the periphery of said interior face of said glazed element than said mounting plate,
- a threaded rod which extends substantially perpendicular to said interior face of said glazed element and in the direction of said interior space.

The glazing according to the invention is notable in that said mounting plate has a hole passing all the way through and opening onto the exterior face and onto the interior face of the mounting plate and said glazed element has at least one hole passing all the way through and opening onto the exterior face and onto the interior face of the glazed element, said hole in the glazed element being coaxial with said hole in said mounting plate.

The hole in said mounting plate is thus situated in a continuation of said threaded rod in the direction of said exterior space.

This hole in the mounting plate is intended to allow the threaded rod to pass toward the exterior space and to allow the threaded rod to turn freely with respect to the mounting plate.

For preference, the periphery of said hole in said mounting plate is set back toward the interior space with respect to said exterior face of the mounting plate, so as to make it easier to compensate for tolerances with respect to the nominal positioning of the glazing and of the opening.

Said glazed element preferably has several holes each passing all the way through and opening onto the exterior face and onto the interior face of the glazed element, as well as several mounting plates and as many mounting plates as there are holes; compensation for tolerances between the glazing and the opening is more effective if there is one mounting plate per hole than if there is one mounting plate associated with a number of holes.

In a first embodiment, the glazed element is a single sheet of glass or very rigid plastic (for example polycarbonate).

In a second embodiment, the glazed element is a multiple laminated element. In this second embodiment, said glazed element comprises an exterior substrate, an interior substrate and a plastic interlayer situated between the exterior substrate and the interior substrate, said substrates and said sheet of plastic each having an edge face, and said edge faces preferably being in continuity with one another.

The or each sheet of plastic used in the laminated glazed element according to the invention has the ability to enhance the mechanical strength by causing the sheet of glass on top to adhere to the substrate underneath; in this laminated glazed element, at least one of these sheets of plastic, or even all of these sheets of plastic, may furthermore have noise insulating capabilities.

In this second embodiment, creating the holes in the glazed element is more complicated because the holes need to be made prior to lamination, but this complication is compensated for by the benefit provided by the invention.

In one alternative form, said threaded rod preferably comprises a head which is situated at least in part inside said hole and does not protrude from said exterior face of said glazed element, so that the head is protected by the glazed element and also so that it does not constitute a protruding element that would project beyond the overall line of the means of transport.

The head of the threaded rod is pressed directly or indirectly against the exterior face of the mounting plate when the glazed element is being fixed; the hole in the mounting plate is thus intended to retain the head of the threaded rod so that the mounting plate can transmit a reaction force to the glazed element when the threaded rod is attached to the opening in the bodywork of the means of transport.

In that case, said head of the threaded rod preferably has an exterior cross section in the hole of the glazed element that is circular, said hole in the glazed element has a circular interior cross section and said hole in the glazed element has a diameter comprised between 1.2 and 1.4 times the diameter of said exterior cross section of said head of the threaded rod, so as to make it easier to compensate for the tolerances with respect to the nominal positioning of the glazing and of the opening.

In another alternative form, said threaded rod comprises a head which is situated outside of the hole in the glazed element, in said exterior space, so as to allow the use of a large head, which provides better retention of the glazed element.

In this alternative form, there is preferably the interposition of a shim or of a washer between the head and the mounting plate.

Said profiled strip is preferably entirely peripheral; it is made in one piece all around the glazed element; it preferably has a thickness greater than the sum of the thickness of said layer of glue and of the thickness of said mounting plate, in order on the one hand to prevent contact between said mounting plate and a bodywork flange facing the mounting plate and, on the other hand, to keep the profiled strip under compressive stress as the glazing is being fixed.

Said layer of glue is present over the entire surface of the interior face of said glazed element that faces the exterior face of said mounting plate.

The present invention moreover relates to a method for fixing a fixed side glazing in an opening of a side wall of a means of transport, particularly a side wall of a tramway, said glazing being in accordance with the invention, said threaded rod being introduced into the hole in said glazed element, then into the hole in said mounting plate, in the direction of said interior space, then a nut is screwed onto said threaded rod against a rabbet.

Advantageously, the present invention thus allows a glazed element to be fixed to a bodywork opening in a reliable, precise and rapid manner.

The present invention in particular makes it possible to offer a number of points of freedom in the adjustment of the position of the fixing with respect to the bodywork opening and thus makes it possible to compensate for large discrepancies in the respective positioning of the glazed element and of the mounting plate fixing with respect to the bodywork opening.

Advantageously, the present invention thus makes it possible to achieve a fixed multiple glazing which has a smooth external appearance, with no mechanical elements further toward the outside than the exterior face of the glazed element.

Figure 2:
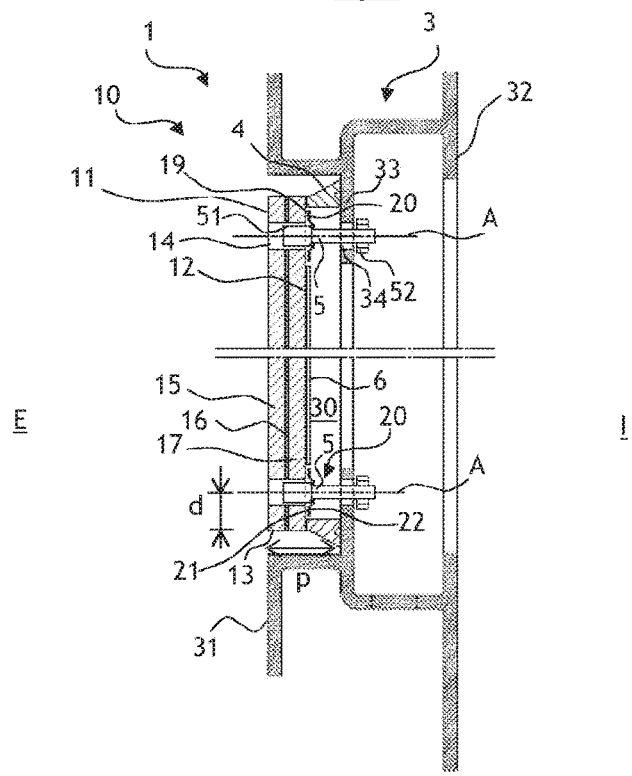
Figure 3:
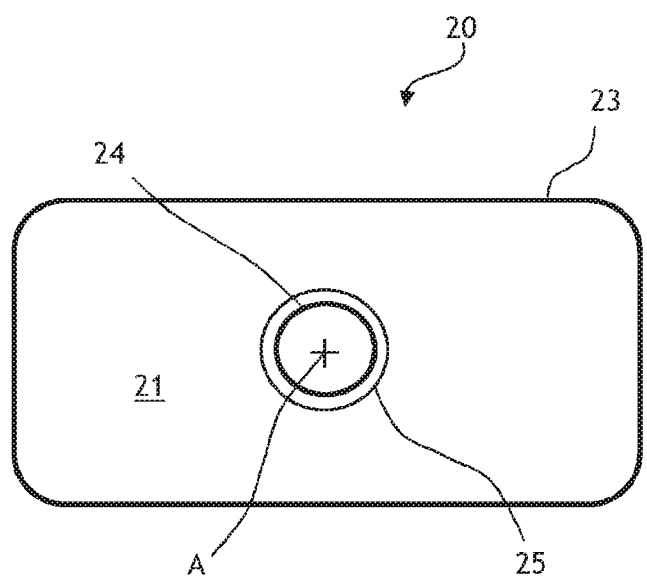

The details and advantageous features of the invention will become apparent from the nonlimiting example that follows, illustrated using the attached figures which illustrate:

in FIG. 1, one embodiment of a fixed glazing according to the invention, viewed from the interior space;

in FIG. 2, the glazing of FIG. 1, viewed in vertical section through the glazing on AA of this figure; and in FIG. 3, the mounting plate of FIG. 2, viewed from the exterior face thereof.

The various elements have been drawn to scale respecting their relative proportions in FIGS. 1 to 3, in order to make these figures easier to study; throughout the figures, the same references denote the same elements.

FIG. 1 illustrates a side glazing 1 of a means of transport according to the invention, as may be seen by a passenger situated inside this means of transport.

This is, in particular, a side glazing of a tramway and FIG. 1 thus illustrates what a passenger of the tramway sees when looking out of the left or right side with respect to an overall direction of forward travel of the tramway.

This glazing thus produces a vertical separation between an interior space I which is inside the tramway and an exterior space E which is outside the tramway.

In the embodiment of FIG. 1, the glazing 1 is in one piece, with no opening window within the glazing.

In the embodiment illustrated, the glazed element 10 is a laminated glazed element comprising:

an exterior substrate 15 which comprises two main faces: an exterior face which faces the exterior space E and an intermediate face which is on the opposite side to the exterior face; this substrate moreover comprises a peripheral edge face, an interior substrate 17 which comprises two main faces: an interior face which faces the interior space I and an intermediate face which is on the opposite side to the interior face; this substrate moreover comprises a peripheral edge face, and a plastic interlayer 16 situated between the exterior substrate 15 and the interior substrate 17 and which comprises two main faces: one facing toward the exterior substrate and the other facing toward the interior substrate, as well as a peripheral edge face.

The exterior substrate 15, the plastic interlayer 16 and the interior substrate 17 are each made in one piece. These three elements are superposed in such a way that their respective edge faces are in continuity with one another. The plastic interlayer adheres on each of its faces to the substrate that is positioned against this face.

This glazing 1 is a fixed glazing insofar as the glazing is intended to be fixed to the structure of the means of transport (in this instance the tramway) without the possibility of moving with respect to this structure when the tramway is in operation.

The glazed element 10 also comprises top and bottom horizontal edges, as well as left and right lateral edges (as seen from the inside, as in FIG. 1).

The glazing 1 is intended to be fixed to a side wall 3 of a means of transport, particularly a side wall of a tramway. More specifically, it is intended to be fixed into an opening 30 in such a wall, in order to close this opening.

However, it is necessary to have the possibility of deactivating the means of fixing the glazing to the opening that it is supposed to close, so that the glazing can be changed out if it becomes broken.

This wall of the opening has an exterior face 31 facing toward the exterior space E and an interior face 32 facing toward the interior space I.

For preference, the glazing 1 has no peripheral strip of glue gluing the edges of the glazing to the structure of the means of transport.

To fix it into the opening 30, the glazing 1 comprises:
- at least one mounting plate 20, as visible in FIG. 3, having an exterior face 21 situated facing the interior face 12 of the glazed element 10, an interior face 22 facing toward the interior space I, and a peripheral edge face 23, and the exterior face 21 of the mounting plate 20 is bonded to said interior face 12 of the glazed element 10 by means of a layer of glue 19, as visible in FIG. 2,
- a peripheral profiled strip 4 situated, at least in part, on the interior face 12 and further toward the periphery of the interior face 12 of the glazed element 10 than the mounting plate 20,
- a threaded rod 5 which extends substantially perpendicular to the interior face 12 of the glazed element 10 toward the interior space I passing through the mounting plate 20.

The mounting plate 20 here is a plate made of metal alloy with a thickness of around 2 mm.

According to the invention, the mounting plate 20 has a hole 24 passing all the way through and opening onto its exterior face 21 and onto its interior face 22, and the glazed element 10 has at least one hole 14 passing all the way through and opening onto its exterior face 11 and onto its interior face 12, the hole 14 in the glazed element 10 being coaxial with the hole 24 in the mounting plate 20.

Because the hole 24 in the mounting plate is produced before the mounting plate is glued to the glazed element and because the hole 14 in the glazed element is produced before the mounting plate is glued to the glazed element, it is at the time of the gluing of the mounting plate to the glazed element that the coaxiality needs to be correctly achieved.

Thus, in order to fix the glazed element, it is possible to introduce the threaded rod 5 into the hole 14 from the exterior space in the direction of the interior space I, to press the head of the threaded rod 5 against the exterior face 21 of the mounting plate, to introduce the threaded rod 5 into a hole 34 in a rabbet 33 of the opening 30 and then to screw a nut 52 onto the threaded rod 5 against the interior face of the rabbet 33 in order to fix the glazing firmly to the opening.

For this fixing-immobilizing operation, the threaded rod may be turned by a suitable tool from the exterior space or prevented from rotating from the exterior space.

This solution makes it possible to reduce the depth p of the rabbet 33, as illustrated in FIG. 2, with respect to an exterior face 31 of the opening, to a value smaller than the solutions of the prior art; and that then makes it possible to increase the space available inside the means of transport.

The depth p may thus be between 20.0 and 90.0 mm; in this instance it is around 60 mm.

As visible in FIG. 1, it is preferable for the glazing 1 to comprise a number of mounting plates 20 and therefore for the glazed element 10 to comprise a number of holes 14 for fixing it into the opening 30.

It is possible, for example, to provide mounting plates along the top and bottom edges of the glazed element 10, for example every 30 cm (distance between the axes of two holes 24).

The threaded rod 5 has an external cross section that is circular and the hole 24 in the mounting plate 20 thus has a circular interior cross section; the hole 24 in the mounting plate 20 has a diameter comprised between 1.1 and 1.4 times the diameter of the exterior cross section of the threaded rod 5.

The hole 34 in the rabbet 33 also has a diameter comprised between 1.1 and 1.4 times the diameter of the exterior cross section of the threaded rod 5.

FIG. 2 illustrates the nominal position, which means to say the ideal position, as provided for in the drawings, of the threaded rod 5 both with respect to the mounting plate 20 (and therefore the glazed element 10) and with respect to the rabbet 33 of the opening 30. This rabbet comprises a hole 34 and, in the ideal position, each of the holes 14, 24, 34 in the glazed element, the mounting plate and the rabbet respectively, has an axis and all the axes are coaxial; the corresponding axis is illustrated as the axis A.

This axis A is preferably situated at a distance d comprised between 10.0 and 40.0 mm from the edge face 13 of the glazed element, and here is situated at a distance of 20.0 mm.

However, given the respective manufacturing tolerances on the glazed element, on the mounting plate and on the rabbet, it is possible in practice, at least in the case of one glazing mounting plate, for this triple coaxiality to be imperfect whereas in the case of one (or more) other glazing mounting plate(s) of the same glazing it is perfect.

Thus, by choosing for at least one of the holes to be slightly greater than the outside diameter of the threaded rod, the succession of the two holes 14, 24 allows a threaded rod to be inserted through these holes while offering the possibility of correcting the coaxiality.

As visible in FIGS. 2 and 3, the periphery of the hole 24 in the mounting plate 20 is preferably set back toward the interior space I with respect to the exterior face 21, which means to say, for example, that a conical recess 25 is produced all around the hole 24 in order to allow the axis of the threaded rod to be modified easily when the head 50 is in abutment against this recess. That makes it easier to compensate for tolerances with respect to the nominal positioning of the glazing and of the opening. The overall thickness of the mounting plate 20, with its conical recess, is of the order of 10.0 mm here.

The head 51 here has an exterior cross section in the hole 14 in the glazed element 10 which is circular, the hole 14 in the glazed element 10 also has a circular interior cross section; said hole 14 in the glazed element 10 has a diameter comprised between 1.2 and 1.4 times the diameter of said exterior cross section of the head 51 so as to make it easier to compensate for tolerance with respect to the nominal positioning of the glazing and of the opening.

The glazed element 10 preferably has several holes 14, each passing all the way through and opening onto the exterior face 11 and onto the interior face 12 of the glazed element 10 and several mounting plates 20 and as many mounting plates as there are holes. Specifically, it is easier to compensate for tolerance between the glazing and the opening if there is one mounting plate per hole than if one mounting plate, with several threaded rods, is associated with several holes.

It has been verified that adequate mechanical integrity is obtained on the basis of the example of FIG. 1, when:
- the two substrates 15, 17 are each made of a glass that has undergone a treatment aimed at strengthening it, such as a heat treatment and, in particular, a tempering heat treatment and are each of a thickness of 1 to 4 mm, for example 2 mm, the sheet of plastic 16 is made of PVB and has a thickness of 0.76 mm.

In the embodiment illustrated, the threaded rod 5 comprises a head 51 which is situated at least in part inside the hole 14 and does not protrude from the exterior face 11 of the glazed element 10; thus the head 51 is both protected by the glazed element and does not constitute a protruding element projecting beyond the overall line of the means of transport.

In an exemplary embodiment that has not been illustrated, it is possible for the threaded rod 5 to comprise a head which is situated outside of the hole 14, in said exterior space, so as to allow the use of a large head, providing better retention of the glazed element.

The profiled strip 4 in this instance is a double lip strip, the two lips of which are in contact with the rabbet 33. It has a thickness greater than the sum of the thickness of the layer of glue 19 (approximately 1 mm) and of the thickness of the mounting plate 20 (approximately 10 mm), so as on the one hand to prevent contact between the mounting plate and the rabbet 33 facing the mounting plate and on the other hand to keep the profiled strip under compressive stress when the glazing is being fixed, so as to ensure sealing.

The layer of glue 19 is present over the entirety of the surface of the interior face 12 of the glazed element 10 that faces the exterior face 21 of the mounting plate 20 so as to maximize the attachment of the mounting plate to this interior face.

The glazing may potentially comprise a protective film 6 situated against part of the interior face 12 of the glazed element 10 with said mounting plate 20 not comprising any clamping member extending on the protective film 6, further toward the inside.

For preference, said threaded rod is crimped to said mounting plate; for example, it comprises a shoulder that prevents it from being unscrewed from said mounting plate, so as to make the positioning of the glazing easier.

The present invention is described in the foregoing by way of example. It is to be understood that a person skilled in the art is competent to vary the invention in various ways without thereby departing from the scope of the patent as defined by the claims.

It may for example be envisioned for some of the fixing mounting plates in the bottom of the glazed element to be replaced by positioning mounting plates or for other mounting plates to be provided in the bottom of the glazed element against the interior face thereof for the purposes of positioning; such positioning mounting plates do not allow definitive fixing of the glazed element in the way that a mounting plate with a threaded rod does, but do allow temporary positioning and/or clipping with respect to the bodywork opening so as to make the definitive fixing of the glazed element using the threaded-rod mounting plate or plates easier.

In a positioning mounting plate, the threaded rod is thus replaced by a clip-fastening pin, fixed to the positioning mounting plate.

By way of another example, a positioning mounting plate may in vertical section have the shape of a h, so that the groove of the h can fit astride the rabbet when the glazing is being positioned in the opening.

In that case, there is then no need for a hole to be made in the glazed element facing the positioning mounting plate.

The invention claimed is:

1. A fixed side glazing for a means of transport, said glazing comprising:
    a glazed element having an exterior face that faces an exterior space, an interior face which faces an interior space, and a peripheral edge face,
    at least one mounting plate having an exterior face situated facing the interior face of said glazed element, an interior face oriented toward said interior space, and a peripheral edge face, and said exterior face of said mounting plate being bonded to said interior face of said glazed element by means of a layer of glue,
    a peripheral profiled strip, situated at least partly on said interior face and further toward the periphery of said interior face of said glazed element than said mounting plate,
    a threaded rod which extends substantially perpendicular to said interior face of said glazed element and in the direction of said interior space,
    wherein said mounting plate has a hole passing all the way through and opening onto the exterior face and onto the interior face of the mounting plate and said glazed element has at least one hole passing all the way through and opening onto the exterior face and onto the interior face of the glazed element, said hole in the glazed element being coaxial with said hole in said mounting plate.

2. The glazing as claimed in claim 1, wherein a periphery of said hole in said mounting plate is set back toward the interior space with respect to said exterior face.

3. The glazing as claimed in claim 1, wherein said glazed element has several holes each passing all the way through and opening onto the exterior face and onto the interior face of the glazed element, as well as several mounting plates and as many mounting plates as there are holes.

4. The glazing as claimed in claim 1, wherein said glazed element is a laminated glazed element comprising an exterior substrate, an interior substrate and a plastic interlayer situated between the exterior substrate and the interior substrate, said exterior and interior substrates and said plastic interlayer each having an edge face, and said edge faces being in continuity with one another.

5. The glazing as claimed in claim 1, wherein said threaded rod comprises a head which is situated at least in part inside said hole and does not protrude from said exterior face of said glazed element.

6. The glazing as claimed in claim 5, wherein said threaded rod comprises a head having an exterior cross section in the hole of the glazed element that is circular, said hole in the glazed element has a circular interior cross section and said hole in the glazed element has a diameter comprised between 1.2 and 1.4 times the diameter of said exterior cross section of said head of the threaded rod.

7. The glazing as claimed in claim 1, wherein said threaded rod comprises a head which is situated outside of said hole, in said exterior space.

8. The glazing as claimed in claim 1, wherein said profiled strip has a thickness greater than the sum of the thickness of said layer of glue and of the thickness of said mounting plate.

9. The glazing as claimed in claim 1, wherein said layer of glue is present over the entire surface of the interior face of said glazed element that faces the exterior face of said mounting plate.

10. The glazing as claimed in claim 1, wherein the glazing is a tramway glazing.

11. A method for fixing a fixed side glazing in an opening of a side wall of a means of transport, said glazing being in accordance with claim 1, the method comprising introducing said threaded rod into the hole in said glazed element, then into the hole in said mounting plate, in the direction of said interior space, then screwing a nut onto said threaded rod against a rabbet.

12. The method as claimed in claim 11, wherein the means of transport is a tramway.

* * * * *